(12) United States Patent
Zoller (10) Patent No.: US 8,402,995 B2
(45) Date of Patent: Mar. 26, 2013

(54) FLOW-VOLUME REGULATOR

(75) Inventor: Uwe Zoller, Auggen (DE)

(73) Assignee: Neoperl GmbH, Muellheim (DE)

( * ) Notice: Subject to any disclaimer, the term of this patent is extended or adjusted under 35 U.S.C. 154(b) by 783 days.

(21) Appl. No.: 12/518,063

(22) PCT Filed: Nov. 17, 2007

(86) PCT No.: PCT/EP2007/009954
§ 371 (c)(1),
(2), (4) Date: Jun. 5, 2009

(87) PCT Pub. No.: WO2008/067903
PCT Pub. Date: Jun. 12, 2008

(65) Prior Publication Data
US 2010/0147397 A1 Jun. 17, 2010

(30) Foreign Application Priority Data

Dec. 6, 2006 (DE) .......................... 10 2006 057 795
Dec. 6, 2006 (DE) ...................... 20 2006 018 577 U
Feb. 28, 2007 (DE) .......................... 10 2007 009 717
Feb. 28, 2007 (DE) ...................... 20 2007 002 904 U (51) Int. Cl.
*F16K 25/00* (2006.01)
(52) U.S. Cl. ...................... 137/454.2; 137/498; 137/550; 239/428.5
(58) Field of Classification Search .................. 137/801, 137/454.2, 12, 544, 550, 505, 505.13, 498; 239/428.5
See application file for complete search history.

(56) References Cited

U.S. PATENT DOCUMENTS

| | | | |
|---|---|---|---|
| 3,847,178 A | 11/1974 | Keppel | |
| 4,000,857 A | 1/1977 | Moen | |
| 4,313,564 A | 2/1982 | Shames et al. | |
| 4,437,493 A * | 3/1984 | Okuda et al. | 138/45 |
| 4,562,960 A | 1/1986 | Marty et al. | |
| 5,769,326 A | 6/1998 | Muchenberger et al. | |
| 2006/0144962 A1 | 7/2006 | Zoller | |

FOREIGN PATENT DOCUMENTS

DE 203 04 659 U1 7/2004
GB 1 603 982 12/1981

OTHER PUBLICATIONS

Translation of PCT/IPEA/409 (International Preliminary Report on Patentability (9 pages).

(Continued)

*Primary Examiner* — Craig Schneider
*Assistant Examiner* — Ian Paquette
(74) *Attorney, Agent, or Firm* — Crowell & Moring LLP (57) ABSTRACT

A flow-volume regulator has an elastic throttle body which delimits, between itself and a housing wall, a control gap that changes under the pressure of a fluid flow, and at least one associated bypass and/or cleaning channel that has at least one channel inlet arranged upstream of the control gap and at least one channel outlet arranged downstream of the control gap. The bypass and/or cleaning channel contains a valve which can move against a restoring force under the pressure of the oncoming fluid, from an open position into a closed position, and seals the bypass and/or cleaning channel in its closed position. The flow-volume regulator allows an additional volume of the fluid through the bypass channel when the oncoming fluid is at low pressure, so that its flow curve is significantly increased in the low pressure range.

11 Claims, 4 Drawing Sheets

OTHER PUBLICATIONS

International Search Report (Form PCT/ISA/220 and 210 for PCT/EP2007/009954 (11 pages).

Translation of PCT/EP2007/010314 "Sanitary Installation Element" (Thirty-seven (37) pages).

* cited by examiner

FLOW-VOLUME REGULATOR

This application is a national stage of PCT International Application No. PCT/EP2007/009954, filed Nov. 17, 2007, which claims priority under 35 U.S.C. §119 to German Patent Application No. 20 2006 018 577.1, filed Dec. 6, 2006; No. 10 2006 057.795.7, filed Dec. 6, 2006, No. 10 2007 009 717.6, filed Feb. 28, 2007; and No. 20 2007 002 904.7, filed Feb. 28, 2007, the entire disclosures of which are herein expressly incorporated by reference.

The invention relates to a sanitary insertion cartridge, which is insertable in a sanitary liquid line and has a flow rate regulator with an elastic restrictor which delimits a control gap that changes under the pressure of the fluid flowing through, between itself and a wall of the housing. At least one bypass channel and/or cleaning channel assigned to the flow rate regulator has at least one channel inlet arranged (relative to the flow direction) before the control gap, and at least one channel outlet arranged (relative to the flow direction) after the control gap. A valve, which is movable under the pressure of the inflowing fluid is provided in the bypass channel and/or cleaning channel, and closes the bypass channel and/or cleaning channel in its closed position.

BACKGROUND OF THE INVENTION

Flow rate regulators exist in a variety of designs. They usually include an annular restrictor, which is made of an elastic material and delimits a control gap that changes under the pressure of the fluid flowing between itself and a wall of the housing. That is, as the pressure rises, the restrictor is pressed progressively into regulating profiles which are formed on a housing wall that is constructed either as a central regulating core or as an outer circumferential wall. Since the control gap contracts as the fluid pressure rises, such a flow rate regulator can adjust the volume of fluid flowing through per unit of time to a fixed maximum value.

Whereas the volume of fluid can be adjusted to a fixed maximum value when the inflowing fluid exhibits high pressure conditions, at low pressure conditions the control gap of the known flow rate regulators constitutes such a flow inhibitor that only comparatively small amounts of the fluid can flow through.

A sanitary insertion cartridge disclosed in U.S. Pat. No. 3,847,178 is implemented as a flow rate regulator and is insertable in a sanitary liquid line. In the exemplary embodiment shown therein in FIG. 13, this known insertion cartridge has a central regulating core, which is sleeve-shaped, and has a regulating profile, on its external circumference over which the water flow washes. The central regulating core encloses an elastic restrictor which delimits a control gap whose clear cross-section changes under the pressure of the liquid flowing between itself and the regulating profile provided on the external circumference of the sleeve-shaped regulating core, in such a way that the quantity of liquid flowing through per unit of time evens out and is regulated to a fixed maximum value. In order to avoid any irregularities in the low pressure range and in order to be able to provide a sufficient quantity of water, even in low pressure ranges, the sleeve inner chamber of the central regulating core is designed as a bypass channel, which has a valve in the area of its channel inlet. The valve moves under the pressure of the liquid flowing through from an open position, against the force of a reset spring, into the closed position. This bypass channel provides a larger light flow cross-section in lower pressure ranges; in relatively higher pressure ranges, the bypass channel is closed by the valve and the flow cross-section is limited to the control gap of the flow rate regulator.

The liquid jet does flow out of the flow rate regulator in U.S. Pat. No. 3,847,178, regulated to a fixed maximum value, but is otherwise uncontrolled. In order to shape the liquid jet into a homogeneous, non-splashing (and optionally also sparkling) soft water jet, a typical jet regulator is to be connected downstream from the flow rate regulator. Like jet regulators, flow rate regulators of this type are impaired in their function by the dirt particles entrained in the liquid, which may accumulate before or in the control gap of the flow rate regulator or in the jet divider of the jet regulator.

SUMMARY OF THE INVENTION

Therefore, one object of the invention is to provide a sanitary insertion cartridge that allows comparatively large volumes of fluid to pass through at low pressure conditions of the fluid flowing through, while also allowing the volume of fluid flowing through per unit of time to be adjusted to an approximately constant maximum value at high pressure conditions. In particular even at high pressures, a homogeneous, non-splashing, and optionally sparkling soft water jet is desirable and high functional reliability is always sought with concurrent freedom from maintenance of the insertion cartridge.

These and other objects and advantages are achieved by the sanitary insertion cartridge according to the invention, in which the flow rate regulator is arranged between a prefilter or filter screen and a jet regulator. The channel inlet of the bypass channel and/or cleaning channel is arranged on the inflow side, before the prefilter or filter screen, and the channel outlet of the bypass channel and/or cleaning channel is connected downstream on the outflow side from the jet regulator or at least a jet divider of the jet regulator.

The insertion cartridge according to the invention also has, in addition to a flow rate regulator, a jet regulator. While the flow rate regulator ensures that the liquid stream flowing through per unit of time does not exceed a specific maximum value, the jet regulator provided on the outflow side on the water outlet may shape a homogeneous, non-splashing, and optionally sparkling soft composite jet. A prefilter or filter screen is connected upstream from the flow rate regulator, which ensures unhindered function of the flow rate regulator and the functional units downstream therefrom, and prevents clogging of these functional units by dirt particles entrained in the fluid stream.

Because the channel inlet of the bypass channel is arranged on the inflow side before the prefilter or filter screen, larger dirt particles may also pass through the bypass channel without the danger that these dirt particles will block in the area of the control gap, for example. Because the channel outlet of the bypass or cleaning channel is connected downstream on the outflow side from the jet regulator itself or at least its jet divider, larger dirt particles may also pass without the danger that the jet regulator, or at least its jet divider, will be blocked by dirt particles of this type and thus inhibited in its function. In the open position of the valve, at least one additional subquantity of the volume flow can pass unimpeded through this bypass channel without having to pass through the control gap of the flow rate regulator that acts initially only as the flow inhibitor.

If the pressure of the fluid flowing through increases and a defined pressure is exceeded, then the valve moves against a reset force into its closed position from its open position, so that the bypass channel is closed. When this occurs, the fluid flowing through can pass only through the control gap, which carries out its regulating function with the volume flow that has increased per unit of time. In comparison to known flow rate regulators, the flow curve of the flow rate regulator according to the invention rises significantly in the low pressure range—a feature that substantially enhances comfort and convenience for applications at low pressure.

It is especially advantageous if the prefilter screen or filter screen has the shape of a funnel, thus also guaranteeing that larger dirt particles will pass only through the bypass channel of the flow rate regulator of the invention.

In a preferred embodiment of the invention, the flow rate regulator is configured in the shape of a ring and encompasses the channel wall that defines the bypass channel.

In one embodiment of the invention, the valve that is provided in the bypass channel has a valve body which can be moved against a reset force in the flow rate regulator.

It is also possible to design the valve body to include a subarea or subpart which is guided through the flow rate regulator (and optionally also through its downstream jet regulator), and which protrudes at least as far as up to the water outlet, as a handle for the purpose of operating the valve by hand. If the valve body with its subarea that serves as a handle projects beyond the water outlet, then the valve body can also be moved against the flow direction of the fluid into the open position even when the fluid is flowing through, so that dirt particles which are trapped in the area of the bypass channel can pass through the bypass channel. Therefore, the bypass channel of such an embodiment has an additional cleaning function.

An additional preferred embodiment of the invention provides that the valve body has a guide pin, which can be moved in the flow rate regulator. In this case it is especially practical to configure the guide pin in the shape of a tube, with the tube interior of the guide pin being constructed as a bypass channel, the upstream end region of the guide pin having at least one channel inlet, and the downstream end region of the guide pin having at least one channel outlet.

It is practical to configure the downstream front opening of the guide pin, which protrudes preferably at least as far as up to the water outlet, as a channel outlet. In this way dirt particles, entrained in the fluid, can be carried away by the guide pin, which is constructed as a bypass channel, so that the flow rate regulator and the operating units (which may or may not be arranged downstream of the flow rate regulator) cannot be clogged by such dirt particles, and hence their function cannot be adversely affected.

It is especially advantageous if the downstream end region of the guide pin is constructed in the shape of a crown, in which case the guide pin (and with it the valve) can be raised manually against the reset force by the application of finger pressure on the downstream end region and can be moved into the open position, so that dirt particles that have collected in the region of the bypass channel can be carried away through the bypass channel and removed by way of the crown-shaped end region.

In another preferred embodiment of the invention, the valve body has a mushroom or dish shape. In this case it is especially advantageous if the valve body is constructed resiliently in at least one umbrella-shaped subarea or part with a peripheral sealing lip on its outer circumference, and if the umbrella-shaped subarea can be moved against the elasticity of the elastic material into a closed position from an open position. Such a valve body requires only a comparatively small degree of complexity in its design.

It is especially advantageous if the rim region of the prefilter screen or filter screen that defines the channel inlet is constructed as a valve seat that interacts with the valve body.

In order to be able to collect temporarily dirt particles that are entrained in the water, if possible, upstream of the flow rate regulator and its downstream operating units, it is practical for the funnel-shaped prefilter screen or filter screen to have an essentially convex or concave funnel shape. In particular, the dirt particles can collect in a concave funnel shape while the flow rate regulator of the invention is running, in order to be able to flow out through the bypass channel as soon as the pressure of the fluid decreases and/or the valve opens. In such an embodiment the additional cleaning function of the flow rate regulator is supported in addition.

Additional features of the invention are disclosed in the following description of the inventive embodiments as well as in the claims. The invention is explained in detail below with reference to preferred embodiments.

BRIEF DESCRIPTION OF THE DRAWINGS

FIG. 1 is a longitudinal view of a sanitary insertion cartridge, which is insertable into a sanitary liquid line, and has a flow rate regulator that is arranged upstream of a jet regulator (relative to the direction of flow), and has a bypass channel which, in its open position (shown), allows an additional subquantity of the volume flow to pass through;

DETAILED DESCRIPTION OF THE INVENTION

FIGS. 1 to 6 depict a variety of embodiments of a sanitary insertion cartridge, which is insertable into a sanitary liquid line and has a flow rate regulator 1, 2, or 3, which is arranged between a prefilter or filter screen (16) and a jet regulator (12). The sanitary insertion cartridges can be installed in the outlet orifice of a plumbing outlet fixture (not shown in detail). It is also possible to insert comparable insertion cartridges in a gas or fluid line.

The flow rate regulators 1, 2, or 3 are designed to adjust the volume of fluid flowing through per unit of time to a fixed maximum value even when the pressure of the inflowing fluid rises. To this end, the flow rate regulators 1, 2, or 3 include an annular restrictor 5, which is made of an elastic material and which delimits a control gap 7 that changes under the pressure of the fluid flowing through, between the restrictor and a wall 6 of the housing. The wall 6 of the housing, which is constructed in FIGS. 1 to 6 as a circumferential wall that encloses the restrictor 5, (but can also be constructed as a regulating body, which is surrounded by a restrictor) has a regulating profile that comprises recesses and notches. As can be seen from a comparison of FIGS. 1 and 2, the elastic restrictor 5 deforms under the pressure of the inflowing fluid, as far as into the regulating profile, in such a manner that at the same time the control gap 7 contracts.

The flow rate regulators 1, 2, or 3, are assigned a central bypass channel 8, which extends coaxially to the longitudinal axis of the flow rate regulators 1, 2, and 3 through their center. Whereas the channel inlet 9 of this bypass channel 8 is arranged (relative to the flow direction) upstream of the control gap 7, its channel outlet 10 is provided (relative to the flow direction) downstream of the control gap 7. This bypass channel 8 (here in the area of the channel inlet 9) has a valve 11 which, under the pressure of the inflowing fluid, moves against a reset force, into a closed position in which it closes the bypass channel 8. In FIGS. 1, 3, 5 and 7, the flow rate regulators 1, 2, and 3 are depicted in their unloaded open position, while in FIGS. 2, 4, and 6 they are shown in the loaded closed position of the valve 11, when the valve is under the pressure of the fluid.

In the open position of the valve 11, at least one additional subquantity of the volume flow can flow unimpeded through the bypass channel 8. If the pressure of the fluid flowing through increases and a defined pressure is exceeded, then the valve moves against a reset force, from its open position, into its closed position, so that the bypass channel 8 is closed. If the bypass channel 8 is closed, the fluid flowing through can pass only through the flow rate regulator 1, 2, 3, which carries out its regulating function with the volume flow that has increased per unit of time. In comparison to known flow rate regulators, the flow rate regulators 1, 2, 3 according to the invention exhibit a flow curve that is significantly higher in the low pressure range—a feature that substantially enhances comfort and convenience for applications at low pressure.

In FIGS. 1 to 6, a jet regulator 12 is arranged downstream of the flow rate regulators 1, 2, and 3 in the direction of flow. The jet regulator is intended to produce a homogeneous, non-splashing (and optionally sparkling soft) composite jet from the water jet flowing out of the outlet fitting. Each of the jet regulators 12 includes an upstream jet divider 13, which divides the inflowing water into a plurality of individual jets. The jet regulator 12 in FIGS. 1 and 2 as well as 5 and 6 has a jet divider 13 which is constructed as an orifice plate, while the jet regulator 12 in the FIGS. 3 and 4 has a jet divider 13 which is constructed as a diffuser. The jet regulators 12 have a downstream flow rectifier 14, which unites the optionally aerated individual jets again into a homogeneous whole jet. A comparison of the FIGS. 1, 2, 5 and 6, on the one hand, and the FIGS. 3 and 4, on the other hand, shows that the jet regulator 12 in the FIGS. 1, 2, 5 and 6 also includes, inserted between the jet divider 13 and the flow rectifier 14, a homogenizing mechanism which is constructed from a plurality of lattice-shaped or net-shaped screens or insert components 15.

Upstream of the control gap 7 of the flow rate regulators 1, 2 and 3 there is a prefilter screen or filter screen 16, which has a concave funnel shape. As can be seen in FIGS. 1 to 6, the central funnel aperture of the funnel-shaped filter screen 16 is constructed as a channel inlet 9 of the bypass channel 8. As a result, the prefilter screen or filter screen 16 can filter out the dirt particles, which are entrained in the fluid and which can have an adverse effect on the function of the flow rate regulators 1, 2, and 3, and possibly also on its downstream operating units, as well. Then the filtered out dirt particles can be carried away over the bypass channel 8, when the valve 11 is situated in its open position. In this case, the bypass channel 8 has an unrestricted cross section that is significantly larger than the control gap 7 of the flow rate regulator 1, 2, 3, Therefore, in the flow rate regulators 1, 2, 3, the bypass channel 8 also performs by an additional cleaning function.

As can be seen in FIGS. 1 to 6, the flow rate regulators 1, 2, 3 are constructed in the shape of a ring and envelop the channel wall that defines the bypass channel 8. In the flow rate regulators 1, 2, shown in the FIGS. 1 to 4, the channel outlet 10 of the bypass channel 8 is arranged (relative to the flow direction) downstream of the control gap of the flow rate regulator 1, 2 and the jet divider 13 of the jet regulator 12, but still upstream of the flow rectifier 14 and the lattice-shaped or net-shaped screens 15 of the homogenizing mechanism. The channel outlet 10 in the case of the flow rate regulator 3, shown in the FIGS. 5 and 6, on the other hand, is arranged (relative to the flow direction) downstream of the jet regulator 12, in such a manner that that fraction of the fluid that flows through the bypass channel 8 (and may or may not be loaded with dirt particles) does not have to pass either through the flow rate regulator 3 or the components of the jet regulator 12.

Figure 5:
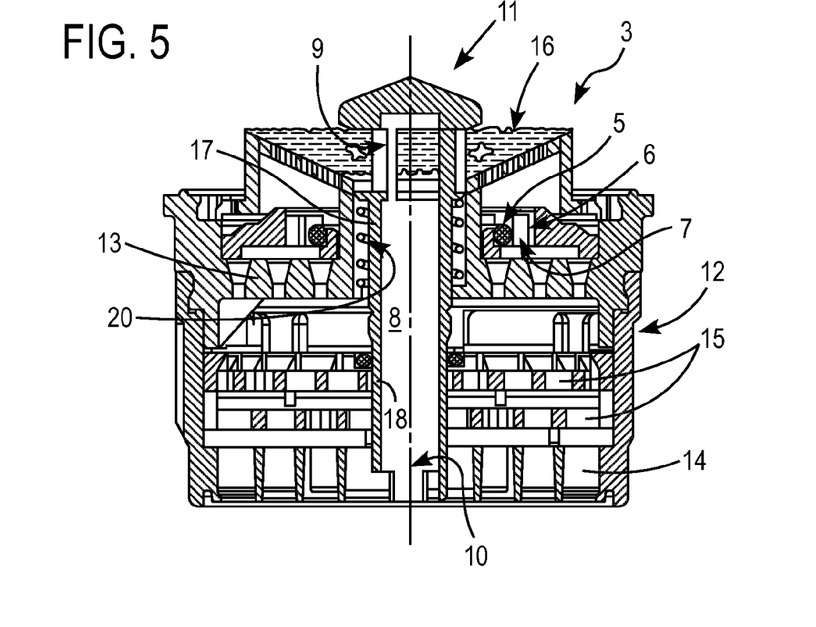
FIG. 5 depicts a sanitary insertion cartridge having a flow rate regulator in which a valve with a valve body that is constructed as a guide pin (shown in its open position) is provided in the bypass channel, the valve body being constructed as a handle on the subarea of the valve body that projects beyond the water outlet, so as to permit operation of the valve body by hand.
Figure 6:
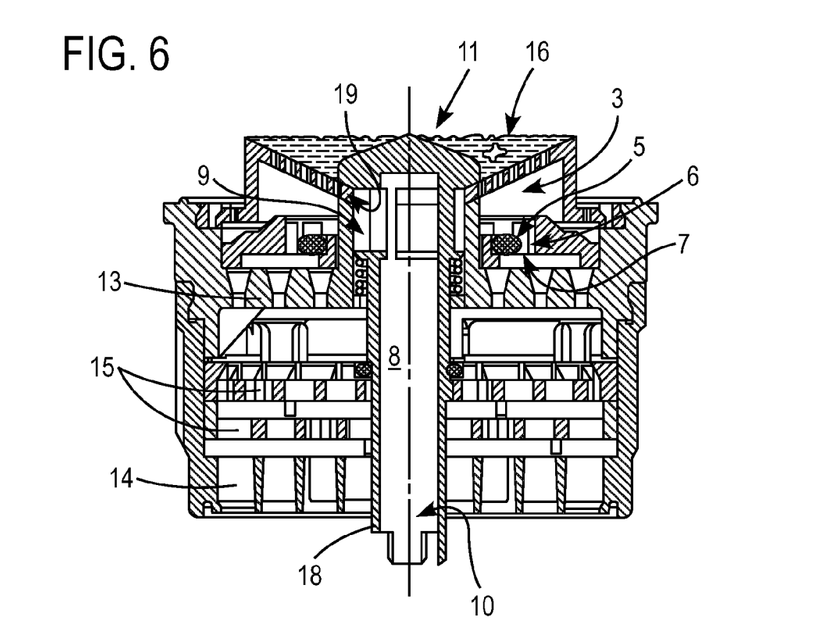
FIG. 6 depicts the insertion cartridge of FIG. 5 in the closed position of the valve provided in the flow rate regulator.

To this end, the valve 11 of the flow rate regulator 3, shown in FIGS. 5 and 6, includes a valve body 17, which has a guide pin 18 that can be moved in the flow rate regulator 3, and is constructed in the shape of a tube, so that the tube interior of the tubular guide pin 18 forms as a bypass channel 8. Whereas the upstream end region of the guide pin 18 has at least one channel inlet 9, the downstream end region of the guide pin 18 has at least one channel outlet 10. This downstream subarea of the valve body 17 protrudes as far as up to the water outlet and is constructed as a handle for the purpose of operating the valve 11 by hand. By applying manual pressure to the end region of the guide pin 18 that projects beyond the water outlet and serves as the channel outlet 10, the dirt particles that may collect in the prefilter screen or the filter screen 16 can be carried away at any time from the area of the flow rate regulator 3. Since the valve 11 opens automatically due to a reset force when the pressure of the inflowing fluid subsides, automatic cleaning events are also possible. In order to prevent the end region of the guide pin 18 that serves as the channel outlet 10 from being closed off due to the manual application of light pressure with a finger tip, the downstream end region of the guide pin 18 is constructed in the shape of a crown.

FIG. 6 shows that the rim region 19 of the prefilter screen or filter screen 16 that defines the channel inlet 9 is constructed as a valve seat, which interacts with the upstream end region of the valve body 17. In this case the end region is designed in the shape of a hat or mushroom. Below the upstream end region of the valve body 17 there is on the circumferential side the wall apertures, which are provided as the channel inlet 9.

The valve 11 depicted in FIGS. 5 and 6 includes a reset spring 20, which generates the reset force. In contrast, the upstream valve body 21 in FIGS. 1-4, which is also formed in this case in the shape of a hat or mushroom, and which belongs to the valve 11, is designed so as to be resilient in at least one frontal subarea and has a sealing lip 22 on its outer circumference. As a result, the umbrella-shaped subarea can be moved against the elasticity of the elastic material into a closed position from an open position.

Figure 1:
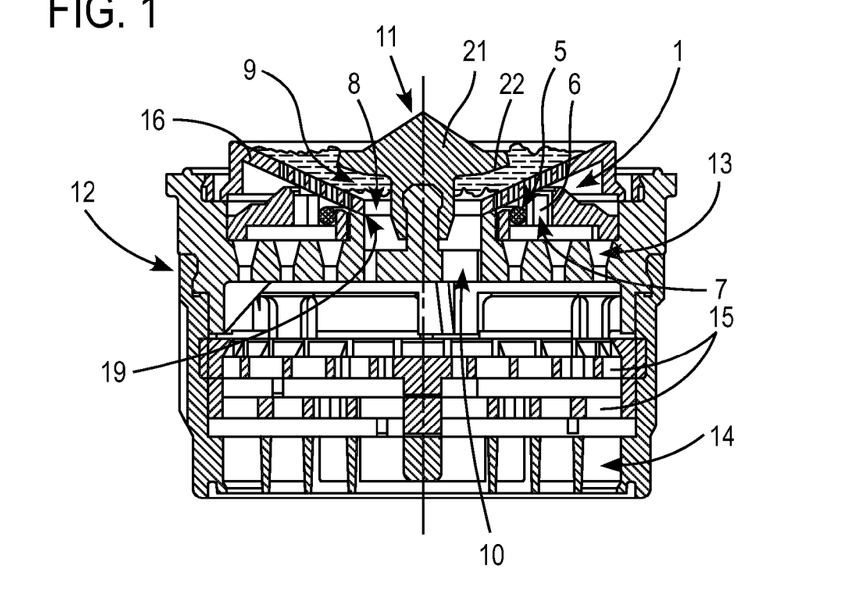
Figure 2:
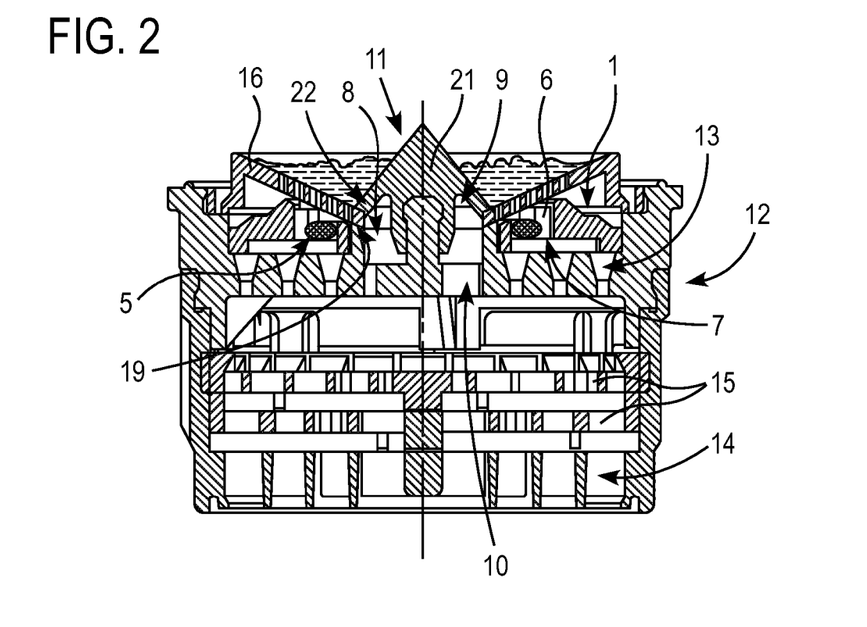
FIG. 2 is also a longitudinal view of the insertion cartridge of FIG. 1 in the closed position of the bypass channel provided in the flow rate regulator.

For example, as can be seen in FIGS. 1 and 2, the jet regulator 12 of the flow rate regulator 1 is designed so as to be self cleaning. In FIG. 1 the flow rate regulator 1, which is arranged below the prefilter screen 16, is shown in an almost pressureless state, while in FIG. 2 the flow rate regulator 1 is shown with flow pressure being applied. As a result, both the valve body 21 (which is situated in the center, is designed in its upstream end region in the shape of a mushroom or hat, and anchored on the jet divider 13) and the restrictor 5 (which is situated below the prefilter screen or filter screen 16) have deformed.

Figure 3:
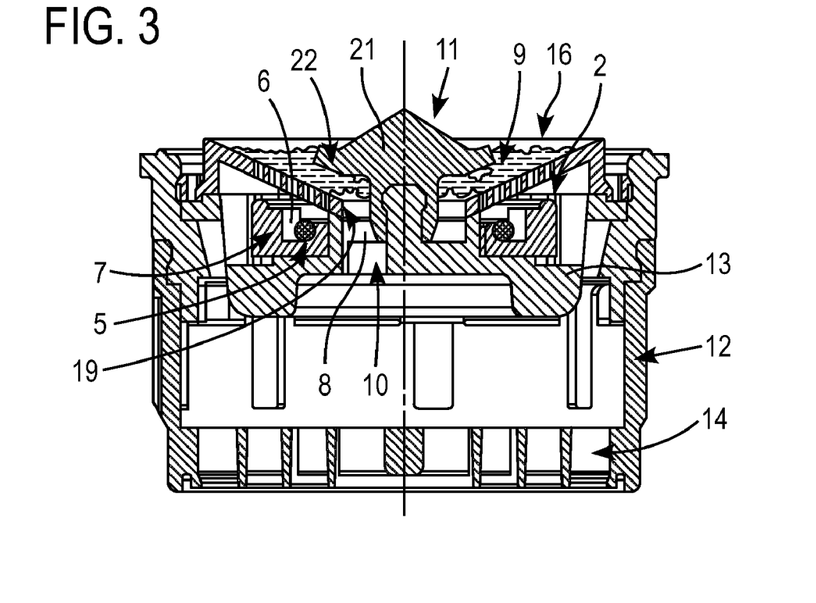
FIG. 3 depicts an insertion cartridge that is comparable to FIGS. 1 and 2 (in the open position of its bypass channel), but with a jet regulator that differs from the one shown in FIGS. 1 and 2, arranged downstream of the flow rate regulator.
Figure 4:
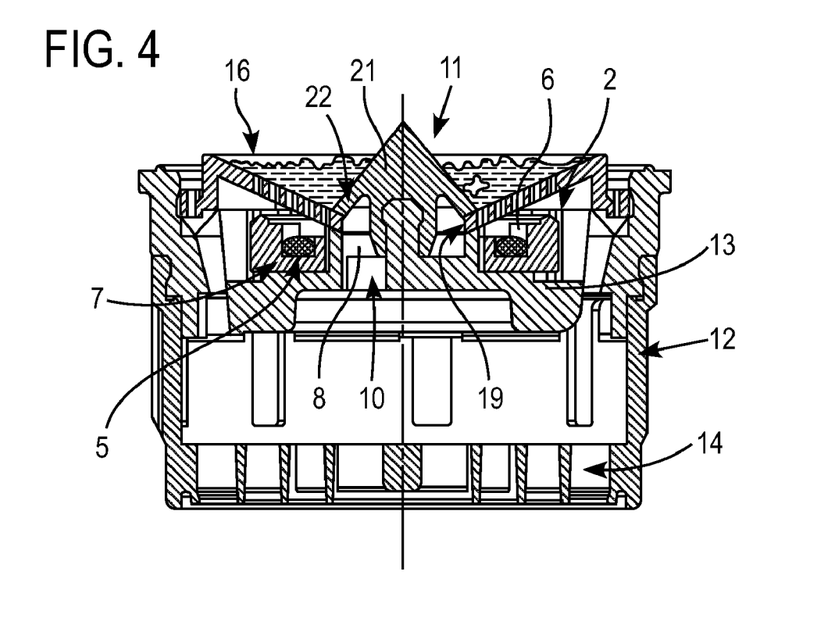
FIG. 4 depicts the insertion cartridge of FIG. 3 in the closed position of the bypass channel.

In FIGS. 3 and 4 the flow rate regulator 2 and its downstream jet regulator 12 are comparably constructed, but the jet regulator 12 has, instead of an orifice plate, a diffuser as the jet divider 13. Moreover, a homogenizing mechanism with additional screens or insert components 15 is provided between the jet divider 13 and the flow rectifier 14. In FIGS. 5 and 6 the installation unit, formed by the flow rate regulator 3 and the jet regulator 12, is constructed as a "heavy duty" design, where the dirt passes through the jet regulator 12 through the guide pin 18, which serves as the flushing tube.

Figure 7:
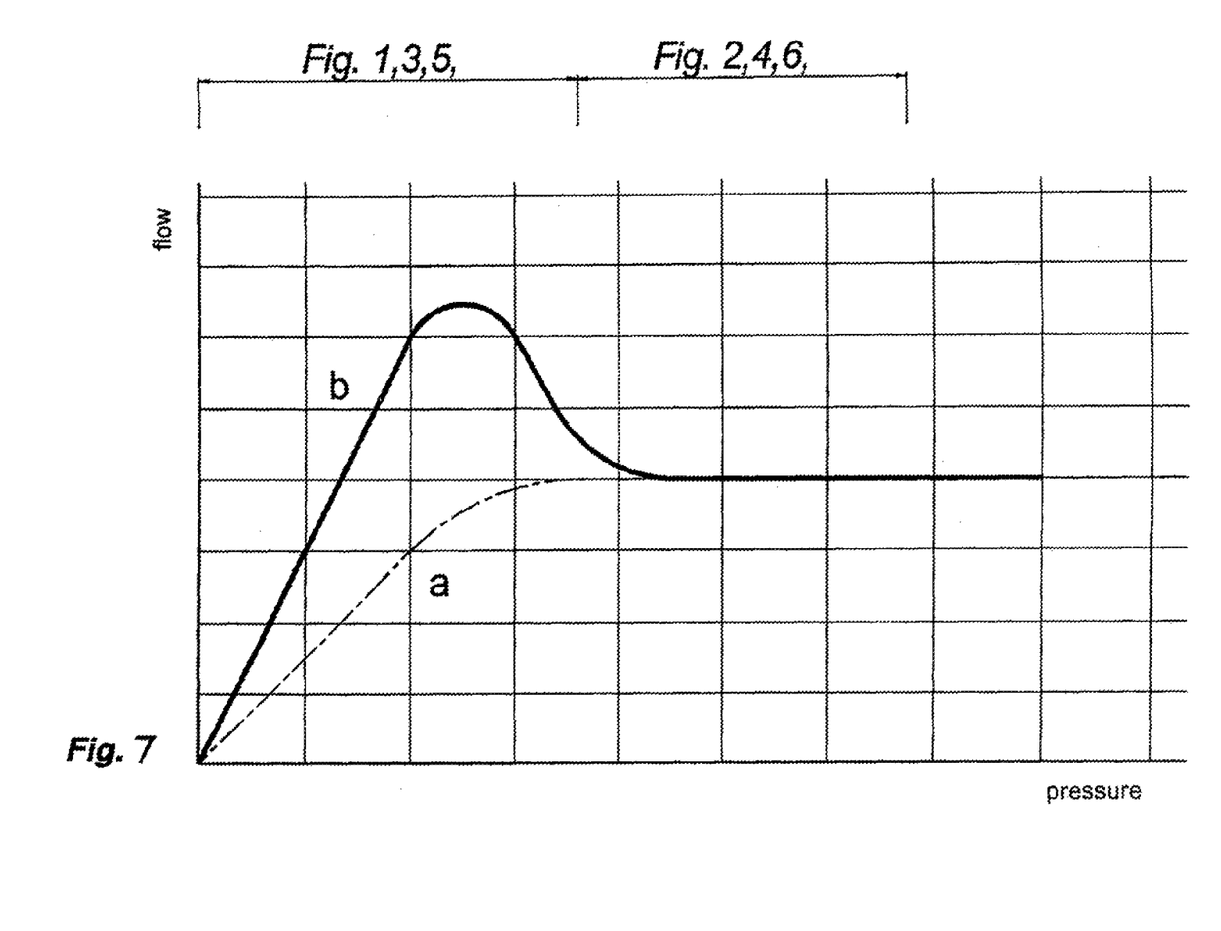
FIG. 7 depicts the flow curve (solid line) of a flow rate regulator according to the invention (shown in FIGS. 1 to 6) in comparison to the flow curve (dashed dotted line) of a conventional flow rate regulator.

FIG. 7 shows the flow curve a of a flow rate regulator that is constructed according to the state of the art. In contrast, the curve profile b shows the behavior of a flow rate regulator according to the invention, and/or a volume regulated jet regulator with a bypass channel 8, as described with reference to FIGS. 1 to 6. The common feature that is shared by all of the embodiments, shown in the FIGS. 1 to 6, is that the flow curve of the flow rate regulators 1, 2, 3 is raised significantly in the low pressure range—a feature that substantially enhances in comfort and convenience for applications at low pressure.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A sanitary insertion cartridge, which is insertable into a sanitary liquid line and has a flow rate regulator with an elastic restrictor that delimits a control gap that changes under pressure of a fluid flowing between the restrictor and a wall of a housing of said flow rate regulator wherein:
   the flow rate regulator includes at least one bypass channel that has at least one channel inlet arranged upstream of the control gap relative to a direction of fluid flow, and at least one channel outlet arranged downstream of the control gap relative to a direction of fluid flow;
   the bypass channel has a valve, which is moveable in response to pressure of said fluid flow, against a reset force, from an open position into a closed position;
   in its closed position the valve closes the bypass channel;
   the flow rate regulator is arranged between a prefilter or filter screen and a jet regulator having at least one jet divider;
   the channel inlet of the bypass channel is arranged upstream of the prefilter or filter screen;
   the channel outlet of the bypass channel is connected downstream from at least one of the jet regulator and the at least one jet divider of the jet regulator;
   the valve includes a valve body, which can be moved against a reset force in the flow rate regulator;
   the valve body comprises an elastic material, is resilient in at least one umbrella-shaped subarea, and has on its outer circumference a peripheral sealing lip;
   the umbrella-shaped subarea can be moved against elasticity of the elastic material into a closed position from an open position; and
   the valve body is arranged above the prefilter or filter screen so that in the closed position the umbrella-shaped subarea seals against a rim region of the prefilter or filter screen.

2. The insertion cartridge, as claimed in claim 1, wherein the flow rate regulator has a ring shape, and includes a channel wall that defines the bypass channel.

3. The insertion cartridge, as claimed in claim 1, wherein a rim region of the prefilter screen or filter screen that defines the channel inlet forms a valve seat that interacts with the valve body.

4. Insertion cartridge, as claimed in claim 1, wherein:
   the prefilter or filter screen has a funnel shape; and
   a funnel aperture of the funnel shape forms a channel inlet.

5. The insertion cartridge, as claimed in claim 4, wherein the funnel-shaped prefilter screen or filter screen has a substantially convex or concave funnel shape.

6. The insertion cartridge, as claimed in claim 1, wherein:
   a subpart of the valve body is guided through the flow rate regulator; and
   said subpart protrudes at least as far as up to a water outlet, and forms a handle that is manipulatable for operating the valve by hand.

7. The insertion cartridge, as claimed in claim 6, wherein a downstream opening of the guide pin protrudes preferably at least as far as up to the water outlet, and forms as a channel outlet.

8. The insertion cartridge, as claimed in claim 1, wherein the valve body has a guide pin, which can be moved in the flow rate regulator.

9. The insertion cartridge, as claimed in claim 8, wherein:
   the guide pin comprises a tube;
   the tube interior of the guide pin is constructed as a bypass channel;
   an upstream end region of the guide pin has at least one channel inlet; and
   a downstream end region of the guide pin has at least one channel outlet.

10. The insertion cartridge, as claimed in claim 9, wherein the downstream end region of the guide pin has the shape of a crown.

11. A sanitary insertion cartridge which is insertable into a sanitary line, said cartridge comprising:
    a screen element which is one of a prefilter screen and a filter screen;
    a jet regulator having at least one jet divider; and
    a flow rate regulator; wherein,
    the flow rate regulator includes a housing and an elastic restrictor that delimits a control gap which changes under pressure of a fluid flow between the restrictor and a wall of said housing;
    the flow rate regulator further includes at least one bypass channel that has at least one inlet arranged upstream of the control gap relative to a direction of fluid flow, and at least one outlet arranged downstream of the control gap relative to a direction of fluid flow;
    the bypass channel has a valve, which is moveable in response to pressure of said fluid flow, against a reset force, from an open position into a closed position;
    in its closed position the valve closes the bypass channel;
    the flow rate regulator is arranged between said screen element and said jet regulator;
    the channel inlet of the bypass channel is arranged upstream of the screen element;
    the channel outlet of the bypass channel is connected downstream from at least one of the jet regulator and the at least one jet divider of the jet regulator;
    the valve includes a valve body, which can be moved against a reset force in the flow rate regulator;

the valve body comprises an elastic material, is resilient in at least one umbrella-shaped subarea, and has on its outer circumference a peripheral sealing lip;

the umbrella-shaped subarea can be moved against elasticity of the elastic material into a closed position from an open position; and the valve body is arranged above the prefilter or filter screen so that in the closed position the umbrella-shaped subarea seals against a rim region of the prefilter or filter screen.

* * * * *